United States Patent [19]

Müller et al.

[11] Patent Number: 4,788,224

[45] Date of Patent: Nov. 29, 1988

[54] TWO STAGE PROCESS FOR THE PRODUCTION OF MOLDED ARTICLES

[75] Inventors: Hanns P. Müller, Bergisch Gladbach; Walter Uerdingen; Heinrich Heine, both of Leverkusen, all of Fed. Rep. of Germany

[73] Assignee: Bayer Aktiengesellschaft, Leverkusen, Fed. Rep. of Germany

[21] Appl. No.: 131,959

[22] Filed: Dec. 11, 1987

[30] Foreign Application Priority Data

Dec. 24, 1986 [DE] Fed. Rep. of Germany ....... 3644382

[51] Int. Cl.⁴ .............................................. C08G 18/14
[52] U.S. Cl. .................................... 521/104; 521/107; 521/108; 521/121; 521/128; 521/129; 521/131; 521/156; 528/48; 528/49; 528/51; 528/53; 528/59
[58] Field of Search ............... 521/104, 107, 108, 121, 521/128, 129, 131, 156; 528/48, 49, 51, 53, 59

[56] References Cited

U.S. PATENT DOCUMENTS 4,564,651  1/1986  Markert et al. ..................... 524/589
4,582,723  4/1986  Markert et al. ..................... 427/116
4,728,676  3/1988  Muller et al. ....................... 521/107

FOREIGN PATENT DOCUMENTS 3323084  1/1985  Fed. Rep. of Germany .

OTHER PUBLICATIONS

W. Siefken in Justus Liebigs Annalen der Chemie, vol. 562, pp. 75–109, 1948.

Primary Examiner—Maurice J. Welsh
Attorney, Agent, or Firm—Gene Harsh; Joseph C. Gil; Lyndanne M. Whalen

[57] ABSTRACT

Molded articles are produced in a two-stage process. In the first stage, an organic polyisocyanate is reacted with an organic compound containing at least two epoxide groups (NCO: epoxide equivalent ratio of 1.2:1 to 500:1) in the presence of a tertiary amine catalyst. This reaction is stopped when no more than 65% of the isocyanate groups have reacted by adding an alkylating sulfonic acid alkyl ester of methyl iodide and/or of dimethyl sulfate in an amount equivalent to the amount of tertiary amine catalyst present. A latent catalyst capable of being activated by heat is subsequently added to the intermediate product and the resultant mixture is heated in a mold to complete the crosslinking of the intermediate product and to form the molded article.

8 Claims, No Drawings

TWO STAGE PROCESS FOR THE PRODUCTION OF MOLDED ARTICLES

BACKGROUND OF THE INVENTION

This invention relates to a two stage process for the production of molded articles by the reaction of an organic polyisocyanate, organic polyepoxide and special catalysts.

Reactive mixtures composed of organic polyisocyanate, organic polyepoxide and special catalysts give rise to synthetic resins with isocyanurate and oxazolidinone structures. They may be prepared by the polyaddition of polyfunctional 1,2-epoxides with polyisocyanates and hardening catalysts (See, e.g., No. EP-A-0,130,454, DE-OS No. 3,323,084 or DE-OS No. 3,323,153).

In an earlier German patent application (No. P 36 00 764.1), the two stage production of molded products based on organic polyisocyanates and organic polyepoxides with tertiary or quaternary ammonium salts of alkylating or acid esters of organic phosphonic acids or of phosphoric acid as catalysts is disclosed. The intermediate "B-state" is obtained in that disclosed process by cooling the reaction mixture and thereby virtually stopping the reaction. The systems disclosed in this earlier application may be converted into the crosslinked, no longer fusible state at a later date by reheating.

SUMMARY OF THE INVENTION

It is an object of the present invention to provide a two stage process for production of molded articles in which the first stage ("B state") is reproducible without an incubation period.

It is also an object of the present invention to provide a two stage process for the production of molded articles in which the "B state" is stable at room temperature for as long as required (i.e., the catalyst used for obtaining the "B state" is completely inactivated after its neutralization by the addition of a catalyst poison).

It is a further object of the invention to provide a two stage process for the production of molded articles which is simple to carry out and results in molded products having mechanical properties comparable to those of molded products obtained by a single stage process.

These and other objects which will be apparent to those skilled in the art are accomplished by reacting an organic polyisocyanate with at least one organic compound containing at least two epoxide groups in the presence of a tertiary amine until no more than 65% of the isocyanate has reacted. The reaction is stopped by adding an alkylating sulfonic acid alkyl ester or methyl iodide or dimethyl sulfate in a quantity equivalent to that of amine present. A latent heat activatable catalyst is then added. The reaction mixture is placed in a mold where it is heated to complete crosslinking and formation of a molded article.

DETAILED DESCRIPTION OF THE INVENTION

The present invention relates to a two stage process for the production of molded articles by the reaction of at least one organic polyisocyanate with at least one organic compound containing at least two epoxide groups in quantities corresponding to an equivalent ratio of isocyanate groups to epoxide groups in the range of from 1.2:1 to 500:1. This reaction is carried out in the presence of a tertiary amine as catalyst to produce an intermediate product containing oxazolidinone and isocyanurate groups. This reaction is stopped when no more than 65% of the isocyanate groups present in the starting mixture have undergone reaction by addition of an alkylating sulfonic acid alkyl ester or methyl iodide or dimethyl sulphate in a quantity at least equivalent to the quantity of the amine. At least one latent catalyst which can be activated by heat is added to the resulting, still liquid or fusible intermediate product, optionally after pulverization, melting or solution of the intermediate product in a suitable solvent. This intermediate product is converted into its final, crosslinked state in a second stage accompanied by shaping and further application of heat.

The isocyanate starting material may be any of the organic polyisocyanates known in polyurethane chemistry. Suitable polyisocyanates include aliphatic, cycloaliphatic, araliphatic, aromatic and heterocyclic polyisocyanates such as those described by W. Siefken in Justus Liebigs Annalen der Chemie, 562, pages 75 to 136. Suitable isocyanates include those corresponding to the formula

$Q(NCO)_n$ in which n represents 2-4, preferably 2 and Q represents an aliphatic hydrocarbon group with 2-18 (preferably 6-10) carbon atoms, a cycloaliphatic hydrocarbon group with 4-15 (preferably 5-10) carbon atoms, an aromatic hydrocarbon group with 6-15 (preferably 6-13) carbon atoms or an araliphatic hydrocarbon group with 8-15 (preferably 8-13) carbon atoms.

Specific examples of such polyisocyanates include: ethylene-diisocyanate, 1,4-tetramethylene-diisocyanate, 1,6-hexamethylene-diisocyanate, 1,12-dodecane-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DE-Auslegeschrift No. 1,202,785, U.S. Pat. No. 3,401,190), 2,4- and 2,6-hexahydrotolylene diisocyanate and any mixtures of these isomers, hexahydro-1,3- and/or -1,4-phenylene-diisocyanate, perhydro-2,4'- and/or -4,4'-diphenylmethane-diisocyanate, 1,3- and 1,4-phenylene-diisocyanate, 2,4- and 2,6-tolylene-diisocyanate and any mixtures of these isomers, diphenylmethane -2,4'- and/or -4,4'-diisocyanate and naphthylene-1,5-diisocyanate. The following may also be used in the present invention: triphenylmethane-4,4'-4"-triisocyanate, polyphenyl-polymethylene polyisocyanates of the kind obtained by aniline-formaldehyde condensation followed by phosgenation (GB No. 874,430 and GB No. 848,671), m- and p-isocyanato-phenylsulphonyl-isocyanate (U.S. Pat. No. 3,454,606), perchlorinated arylpolyisocyanates (U.S. Pat. No. 3,277,138), polyisocyanates containing carbodiimide groups (U.S. Pat. No. 3,152,162), norbornane diisocyanate (U.S. Pat. No. 3,492,330), polyisocyanates containing allophanate groups (GB No. 994,890), polyisocyanates containing isocyanurate groups (U.S. Pat. No. 3,001,973), polyisocyanates containing urethane groups (U.S. Pat. Nos. 3,394,164 and 3,644,457), polyisocyanates containing acylated urea groups (DE-PS 1,230,778), polyisocyanates containing biuret groups (U.S. Pat. Nos. 3,124,605, 3,201,372 and 3,124,605), polyisocyanates prepared by telomerization reactions (U.S. Pat. No. 3,654,106), polyisocyanates containing ester groups (U.S. Pat. No. 3,567,763), reaction products of the above-mentioned isocyanates with acetals (DE-PS No. 1,072,385) and polyisocyanates containing polymeric fatty acid esters (U.S. Pat. No. 3,455,883).

Distillation residues from the commercial production of isocyanates which still contain isocyanate groups may also be used, optionally as solutions in one or more of the above-mentioned polyisocyanates. Any mixtures of the above-mentioned polyisocyanates may also be used.

It is generally preferred to use commercially readily available polyisocyanates such as 2,4- and 2,6-tolylene diisocyanates and any mixtures of these isomers ("TDI"), polyphenyl-polymethylene polyisocyanates obtained by aniline formaldehyde condensation followed by phosgenation ("crude MDI") and polyisocyanates containing carbodiimide groups, urethane groups, allophanate groups, isocyanurate groups, urea groups or biuret groups ("modified polyisocyanates"). Modified polyisocyanates derived from 2,4- and/or 2,6-tolylene diisocyanate or from 4,4'- and/or 2,4'-diphenylmethane diisocyanate are preferred.

It is particularly preferred to use isomeric and/or homologous mixtures of polyisocyanates of the diphenyl methane series containing more than 20 wt. % of 2,4'-diisocyanato diphenyl-methane. These are polyisocyanate mixtures of the diphenylmethane series containing more than 20 wt. %, preferably from 30 to 70 wt. % of polyisocyanate mixtures of the diphenyl-methane series. The most preferred polyisocyanate starting material generally contains other isomers or homologs of polyisocyanates of the diphenylmethane series in addition to the 2,4'-isomer. This means that the most preferred polyisocyanate component is generally a mixture of 2,4'-diisocyanato-diphenylmethane and 4,4'-diisocyanato-diphenylmethane with the optional addition of 0 to 20 wt. % of 2,2'-diisocyanato-diphenylmethane (based on the total quantity of mixture) or of mixtures of these isomers with higher nuclear polyphenyl-polymethylene polyisocyanates. The last-mentioned mixtures generally contain from 10 to 60 wt. % of such higher nuclear polyisocyanates (based on the total quantity of the mixtures).

The first-mentioned preferred polyisocyanate which is a diisocyanate mixture enriched with 2,4'-isomers may be obtained by distilling off a diisocyanate mixture having the desired composition from a polyisocyanate mixture obtained by the phosgenation of aniline/formaldehyde condensates. The other preferred mixture containing a higher nuclear polyisocyanate may be obtained by adding a diisocyanate mixture enriched with 2,4'-isomers distillation product to a phosgenation product from which 4,4'-diisocyanato-diphenylmethane has been removed as described, for example, in DE-AS No. 1,923,214. Alternatively, a polyisocyanate mixture containing the quantity of 2,4'-diisocyanato-diphenylmethane indicated above may be obtained directly by suitably controlling the process of aniline/formaldehyde condensation. U.S. Pat. No. 3,277,173, for example, describes a method for obtaining polyamine mixtures of the dihenylmethane series containing a high proportion of 2,4'-diaminodiphenylmethane. The particularly preferred polyisocyanates of the present invention may then be obtained directly by phosgenating these condensates which contain a high proportion of 2,4'-diaminodiphenylmethane. Methods for obtaining such polyisocyanate mixtures are also described in DE-OS No. 1,937,685 and in U.S. Pat. No. 3,362,979. The most preferred polyisocyanate mixtures which contain higher nuclear polyisocyanates of the diphenylmethane series also contain more than 20 wt. % of 2,4'-diisocyanato-diphenylmethane, based on the total quantity of mixture.

The organic compound containing at least two epoxide groups may be any aliphatic, cycloaliphatic, aromatic or heterocyclic compound containing at least two epoxide groups, i.e., compounds carrying 1,2-epoxide groups. The preferred polyepoxides have 2 to 4, preferably 2 epoxide groups per molecule and an epoxide equivalent weight of from 90 to 500, preferably from 170 to 220.

Specific examples of suitable polyepoxides include: polyglycidyl ethers of polyvalent phenols such as pyrocatechol, resorcinol, hydroquinone, 4,4'-dihydroxy diphenylmethane, 4,4'-dihydroxy-3,3'-dimethyldiphenylmethane, 4,4'-dihydroxy-diphenylmethane, 4,4'-dihydroxy-diphenylcyclohexane, 4,4'-dihydroxy-3,3'-dimethyl-diphenylpropane, 4,4'-dihydroxy-diphenyl, 4,4'-dihydroxy-diphenylsulphone, tris-(4-hydroxyphenyl)-methane, of the chlorination and bromination products of the above-mentioned diphenyls or of novolaks (i.e., reaction products of monovalent or polyvalent phenols with aldehydes, in particular formaldehyde, in the presence of acid catalysts), of diphenols obtained by the esterification of 2 mols of the sodium salt of an aromatic hydroxycarboxylic acid with 1 mol of a dihalogenalkane or dihalogendialkyl ether (See British Pat. No. 1,017,612) or of polyphenols obtained by the condensation of phenols and long chained halogenated paraffins containing at least two halogen atoms (see GB-PS 1,024,288). The following are also suitable: polyepoxide compounds based on aromatic amines and epichlorohydrin such as N-di-(2,3-epoxypropyl)-aniline, N,N'-dimethyl-N,N'-diepoxypropyl-4,4'-aminodiphenyl-methane and N-diepoxypropyl-4-aminophenylglycidyl ether (See GB Nos. 772,830 and 816,923). Glycidyl esters of polybasic aromatic, aliphatic and cycloaliphatic carboxylic acids such as phthalic acid diglycidyl ester, adipic acid diglycidyl ester and glycidyl esters of reaction products of 1 mol of an aromatic or cycloaliphatic dicarboxylic acid anhydride and ½ mol of a diol or 1/n mol of a polyol containing n hydroxyl groups and hexahydrophthalic acid diglycidyl ester optionally substituted with methyl groups are also suitable. Glycidyl ethers of polyhydric alcohols such as 1,4-butane diol, 1,4-butene diol, glycerol, trimethylol, propane, pentaerythritol and polyethylene glycols may also be used in the practice of the present invention. Triglycidyl isocyanurate, N,N'-diepoxypropyl-oxamide, and polyglycidyl thioethers of polyvalent thiols (for example, of bis-mercaptomethylbenzene), diglycidyl trimethylene trisulphone, and polyglycidyl ethers based on hydantoins are also of interest.

Epoxidation products of polyunsaturated compounds such as vegetable oils and their conversion products, epoxidation products of di- and polyolefins such as butadiene, vinylcyclohexene, 1,5-cyclooctadiene, 1,5,9-cyclododecatriene, polymers and copolymers still containing epoxidizable double bonds, e.g., those based on polybutadiene, polyisoprene, butadiene-styrene copolymers, divinylbenzene, dicyclopentadiene and of unsaturated polyesters; epoxidation products of olefins which are obtainable by Diels-Alder-Addition and are subsequently converted into polyepoxides, the epoxidation product obtained from compounds containing two cyclopentene or cyclohexene rings linked together by bridging atoms or atomic groups; and polymers of unsaturated monoepoxides such as methacrylic acid glycidyl esters or allylglycidyl ethers may also be used.

Preferred polyepoxide compounds and mixtures thereof include polyglycidyl ethers of polyvalent phenols, in particular of bisphenol A; polyepoxide compounds based on aromatic amines, in particular on bis-(N-epoxypropyl)-aniline, N,N'-dimethyl-N,N'-diepoxypropyl-4,4'-diaminodiphenylmethane and N-diepoxypropyl-4-amino-phenylglycidyl ether; polyglycidyl esters of cycloaliphatic dicarboxylic acids, in particular hexahydrophthalic acid diglycidyl ester; and polyepoxides obtained from the reaction product of n mol of hexahydrophthalic acid and hydride and 1 mol of a polyol containing n hydroxyl groups (n=integer from 2 to 6), in particular 3 mol of hexahydrophthalic acid anhydride and 1 mol of 1,1,1-trimethylol propane or 3,4-epoxycyclohexylmethane-3,4-epoxycyclohexane-carboxylate.

Liquid polyepoxides or low viscosity diepoxides such as bis-(N-epoxipropyl) aniline or vinylcyclohexane diepoxide may in special cases lower the viscosity of already liquid polyepoxides or convert solid polyepoxides into liquid mixtures.

The epoxide compound is used in a quantity corresponding to an equivalent ratio of isocyanate groups to epoxide groups in the range of from 1.2:1 to 500:1, preferably from 3:1 to 65:1, most preferably from 5:1 to 30:1.

The amine catalyst may be any mono- or polyfunctional organic amine containing tertiary amino groups. Suitable amines of this type generally have a molecular weight of up to 353, preferably from 101 to 185. Tertiary amines which are liquid at the reaction temperature of the first stage of the reaction are preferred. Examples of suitable and preferred amines include: triethylamine, tri-n-butylamine, N,N,N',N'-tetramethyl-ethylenediamine, N,N-dimethylbenzylamine, triethylene diamine and dimethyloctylamine, N-methylmorpholine and bis-(N,N-dimethyl-aminoethyl)-ether.

The amine catalyst is generally used in a quantity of 0.01 to 2 wt. %, preferably 0.01 to 0.1 wt. %, based on the total weight of polyisocyanate and epoxide reactants.

The reaction stoppers are catalyst poisons for the amine catalyst. Any alkylating esters of organic sulfonic acids are suitable. These sulfonic acid alkyl esters preferably have a molecular weight of from 110 to 250. Both aliphatic sulfonic acid alkyl esters such as n-butane sulfonic acid methyl ester, n-perfluorobutane sulfonic acid methyl ester and n-hexane sulfonic acid ethyl ester and aromatic sulfonic acid alkyl esters such as benzene sulfonic acid methyl, ethyl, or n-butyl ester, p-toluene sulfonic acid methyl, ethyl or n-butyl ester, 1-naphthalene sulfonic acid methyl ester, 3-nitrobenzene sulfonic acid methyl ester or 2-naphthalene sulfonic acid methyl ester are suitable. The aromatic sulfonic acid esters are preferred. It is particularly preferred to use p-toluene sulfonic acid methyl ester. Methyl iodide and dimethyl sulfate may also be used but are less preferred.

The reaction stopper is generally used in an amount at least equivalent to the tertiary amine nitrogen atoms of the amine catalyst.

The compound used as latent catalyst may be tertiary or quaternary ammonium salts of (i) organic amines and (ii) alkylating or acid esters of organic phosphonic acids or of phosphoric acid; or addition complexes of boron trihalides with tertiary amines.

The organic amine from which the ammonium salt latent catalyst is formed may be any monofunctional or polyfunctional organic amine containing secondary and/or tertiary amino groups. In the course of preparation of the catalyst, secondary amino groups may be converted into tertiary ammonium groups by alkylation and tertiary amino groups may be converted by neutralization into tertiary ammonium groups or by quaternization into quaternary ammonium groups. Suitable amines of this kind generally have a molecular weight in the range of from 45 to 353, preferably from 45 to 185. Typical examples of suitable amines include: dimethylamine, trimethylamine, diethylamine, triethylamine, di-n-butylamine, tri-n-butylamine, N,N'-dimethyl-ethyl-ethylene-diamine, N,N,N',N'-tetramethyl-ethylene diamine, N,N-dimethyl-benzylamine, triethylenediamine, dimethyloctylamine, diazabicyclooctane, methyltrioctylamine, N-methylmorpholine and bis-(N,N-dimethyl-aminoethyl)-ether.

The esters from which the ammonium salt latent catalyst may be formed include: alkylating and acid esters of organic phosphonic acids and phosphoric acid. The acid esters used are preferably neutral, alkylating esters of organic phosphonic acids. These generally have a molecular weight of from 124 to 214. Particularly suitable examples include: methane phosphonic acid dimethyl ester, methane phosphonic acid diethyl ester, benzene phosphonic acid dimethyl ester, benzene phosphonic acid diethyl ester and ethane phosphonic acid diethyl ester. The esters of phosphoric acid may be either monobasic acid esters or neutral esters. These compounds generally have a molecular weight of from 126 to 266. Examples of suitable phosphoric acid esters include: dimethyl phosphate, diethyl phosphate, di-n-butyl phosphate, triethyl phosphate and tri-n-butyl phosphate. Methane phosphonic acid dimethyl ester and di-n-butyl phosphate are preferred.

The ammonium salt latent catalysts may be prepared by the known process (e.g. Houben-Weyl, Volume XII/2, page 262 ff) of reacting amine and ester components such as those described above in, preferably, equivalent quantities at temperatures of 20° to 200° C., with or without solvent. It may be advantageous to carry out this reaction under inert gas and/or pressure. One of the components may, for example, be used in excess and any unreacted excess may subsequently be removed (for example, by distillation).

Examples of particularly preferred ammonium salt latent catalysts include:

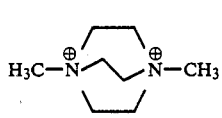 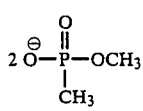

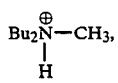 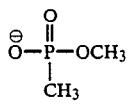

 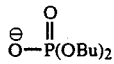

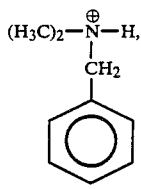 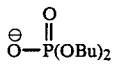

Suitable boron trihalide complex latent catalysts include the known addition complexes of boron trihalides (in particular boron trichlorides and boron trifluorides) with tertiary amines. The addition complexes of boron trichloride and tertiary amines described in DE-P No. 2,655,367 corresponding to the general formula

in which $R_1$, $R_2$ and $R_3$ represent identical or different aliphatic, aromatic, heterocyclic or arylaliphatic groups, pairs of which may be components of heterocyclic rings are particularly useful. The analogous complexes of boron trifluoride corresponding to the formula

in which $R_1$, $R_2$ and $R_3$ have the meanings indicated above are also suitable. Other examples of suitable complexes include the corresponding boron trichloride and boron trifluoride complexes of tertiary amines of the type described above (with respect to amine catalyst and amines useful in the production of ammonium salt latent catalysts) and heterocyclic tertiary amines such as 1,2-dimethyl-imidazole and 1-benzyl-2-phenyl-imadazole. The amine component of the complexes generally has a molecular weight of up to 353, preferably from 101 to 185.

The latent cataylst is generally used in a quantity of 0.01 to 20 parts by weight, preferably 0.1 to 10 and most preferably 0.5 to 5 parts by weight, based on 100 parts by weight of the intermediate stage in the "B-state" (i.e. the resin present after the initial reaction has been stopped by adding the catalyst poison).

The latent catalyst may also be a mixture of any of the above-described latent catalysts. The reaction time and reaction temperature both for the preparation of the intermediate stage ("B-state") and for hardening of the resin present in the intermediate stage may be adapted to the individual requirements by the choice and concentration of amine catalyst and latent catalyst.

The auxiliary agents and additives which may optionally be used in the practice of the present invention include polymerizable, olefinically unsaturated monomers used in quantities of up to 100 wt. %, preferably up to 50 wt. %, based on the total weight of polyisocyanate and epoxide components. Typical examples of such additives include olefinically unsaturated monomers free from isocyanate reactive hydrogen atoms (e.g. diisobutylene, styrene, $C_1-C_4$-alkylstyrenes such as α-methylstyrene or α-butylstyrene, vinyl chloride, vinyl acetate), maleic imide derivatives such as bis-(4-maleic imido-phenyl)-methane, $C_1-C_8$-alkyl esters of acrylic acid (such as methyl acrylate, butyl acrylate and octyl acrylate), the corresponding methacrylic acid esters, acrylonitrile and diallylphthalate. Any mixtures of such olefinically unsaturated monomers may also be used. If such additives are used at all, styrene and/or $C_1-C_4$ alkyl esters of (meth) acrylic acid are preferred. When these additives are used, conventional polymerization initiators such as benzoyl peroxide may be added although these are generally not necessary.

Further examples of optional auxiliary agents and additives include: organic compounds in the molecular weight range of 62 to 2000 containing at least 2, in particular 2 to 8, preferably 2 or 3 alcoholic hydroxyl groups, such as those commonly used as starting components for polyurethanes. Examples of these compounds include simple polyhydric alcohols such as ethylene glycol, hexane-1,6-diol, glycerol and trimethylol propane; polyols containing dimethylsiloxane units, e.g. bis-(dimethyl-hydroxymethyl-silyl)-ethers; polyhydroxy compounds containing ester groups, such as castor oil; polyhydroxypolyesters obtainable by the polycondensation of excess quantities of simple polyhydric alcohols of the kind described above with, preferably, dibasic carboxylic acids or their anhydrides (e.g. adipic acid, phthalic acid or phthalic acid anhydride); or polyhydroxypolyethers obtainable by the addition of alkylene oxides (such as propylene oxide and/or ethylene oxide) to suitable starter molecules such as water, the above-mentioned simple alcohols or amines containing at least two amine NH bonds. These additives, if used at all, are added at most in a quantity corresponding to an NCO/OH equivalent ratio of not less than 2:1, preferably at least 2.5:1, based on the isocyanate groups of the polyisocyanate reaction component and hydroxyl groups of the additive. The quantity of polyisocyanate component must in any event be calculated to provide an equivalent ratio of isocyanate groups to the sum of epoxide groups, hydroxyl groups from any additives and any hydroxyl groups possibly present in the epoxide component amounting to at least 1.2:1, preferably from 4:1 to 30:1.

The addition of auxiliary agents and additives is generally not necessary. The monomeric additives are preferred to the polyhydric additives. It is, however, possible in principle to use both types of auxiliary agents and additives.

Optional auxiliary agents and additives also include fillers such as quartz powder, chalk or aluminum oxide; pigments such as titanium dioxide, iron oxide and organic pigments such as phthalocyanine pigments; plasticizers such as dioctylphthalate, tributyl phosphate and triphenyl phosphate; soluble dyes; and reinforcing agents such as glass fibers or glass fabrics. Carbon fibers and fabrics of carbon fibers and other organic polymer fibers such as aramide fibers or LC polymer fibers (LC="liquid crystal") are also suitable.

The auxiliary agents and additives may be incorporated with the starting materials before the process of the present invention is carried out or they may be added at a later stage to the resin, optionally after the latter has been pulverized, melted or dissolved in a suitable solvent.

To carry out the process of the present invention, the starting materials (i.e., polyisocyanate, epoxide and amine catalyst) and optionally auxiliary agents and additives or a portion thereof are mixed together and reacted at a temperature in the range of from 20° to 150° C., preferably from 60° to 130° C. After conversion of no more than 65%, preferably 30 to 60% of the isocyanate groups in the starting mixture, the reaction is stopped by the addition of an alkylating ester stopper. The intermediate product in the "B-state" obtained at this stage is generally a liquid at room temperature or a solid which is fusible at a temperature of at the most 120° C. and may be put into the second stage of the process of the present invention after any desired period of intermediate storage.

In the second stage of the process of the present invention, the latent catalyst and any further auxiliary agents and additives used are added to the intermediate product, optionally after the latter has been pulverized, melted or dissolved in a suitable solvent. If the resin in the "B state" is to be worked up from solution, suitable solvents for this purpose include not only inert solvents such as acetone, butyl acetate, methylethylketone, methylpyrrolidone, and mixtures thereof but also so called "reactive diluents" which may be polyisocyanates which are liquid at room temperature or polyepoxides which are liquid at room temperature, provided that such a mixture contains an excess of NCO groups over epoxide and hydroxyl groups corresponding to an equivalent ratio of at least 1.2:1, preferably at least 3:1.

Hardening is carried out by heating the mixture to temperatures of at least 60° C., preferably 60° to 150° C. For obtaining optimum properties, it is frequently advantageous to carry out an after-hardening of the resulting synthetic resins at temperatures in the region of 150° to 250° C., preferably at 200° to 130° C.

The process of the present invention may also be used to prepare impregnating compositions for electro insulation or for glass fiber reinforced laminates. This process is also suitable for the production of electrical components such as printed circuits, electronic clocks, pocket calculators, electronic cameras, computers, micro computers and digital data storage systems by the casting process. Molded articles of this kind are produced by a known method for molding the resins in the "B state", either before or during the heat treatment. The resins in the "B state" may also be used as casting compounds for the electrical industry.

The heat resistance, low dielectric losses, moisture resistance and abrasion resistance as well as ease of shaping in molds of the products of the process of the present invention are excellent. In addition, the process of the present invention is suitable for the manufacture of insulating materials in insulating classes H and C in electric motors and generators, and for the production of construction materials for aircraft, rockets or other apparatus subjected to severe stresses. If the resins in the "B state" are solid, they may be used as powder lacquer binders or as adhesives, in particular for thermoplasts. Insulators, transformers, condensers, molded laminates for the manufacture of pipes, containers or sports equipment may also be produced from the resins in the "B state" which have been worked up by some suitable process. The resins in the "B state" may also be used for the production of foams if they have been worked up in combination with appropriate blowing agents.

The invention is further illustrated but is not intended to be limited by the following examples in which all parts and percentages are by weight unless otherwise specified.

EXAMPLES

Example 1

950 parts by weight of a mixture of 60% of 2,4'-diisocyanatodiphenyl methane and 40% of 4,4'-diisocyanatodiphenyl methane (NCO content=33.6%) were mixed with 50 parts by weight of the diglycidyl ether of bisphenol A (epoxide number=0.585) and 0.5 ml (3.2 m mol) of dimethylbenzylamine at 50° C. and the mixture was then heated to 120° C. The slightly exothermic reaction indicated the instant onset of the formation of isocyanurate an oxazolidinone. After a reaction period of 15 minutes without external heating, the reaction mixture was cooled with ice water. The reaction temperature was thereby adjusted to about 90° C. A sample of the reaction mixture was removed. This sample was a solid, sticky resin at room temperature and had an NCO content of 18.4%. The reaction was stopped by the addition of 6.5 ml of stopper solution I (a 15.4 wt. % solution of p-toluene sulfonic acid methyl ester in a mixture of 60% 2,4'-diisocyanatodiphenyl methane and 40% 4,4'-diisocyanato diphenylmethane). A further 596 parts by weight of the above-mentioned diisocyanate component and 31 parts by weight of the above-mentioned glycidyl ether were then added to the reaction mixture and the whole mixture was stirred at 120° C. until a clear, homogeneous solution was obtained. A clear yellow resin which was liquid at room temperature was obtained. The resin was stable in storage and had a viscosity at 25° C. of 9, 300 mPa.s and an NCO content of 23.6%.

Example 2

40 parts by weight of the diglycidyl ether described in Example 1 and 760 parts by weight of the polyisocyanate mixture also described in Example 1 were mixed with 0.4 ml of dimethylbenzylamine at 60° C. The mixture was then heated to 110° C. The external source of heating was removed. The temperature of the reaction mixture rose within the next 5 to 10 minutes from 114° to 115° C. due to the slightly exothermic formation of oxazolidinone and isocyanurate. The reaction temperature was lowered to 80° C. by external cooling. 343 g of methylethylketone were added to the reaction mixture at this temperature. A clear solution was obtained. The reaction temperature of this solution was adjusted to 40° C. by the addition of solvent. The isocyanate content of the mixture was determined after this addition and found to be 17.2%. Stirring was continued for a further 75 minutes at 40° C. and the isocyanate content was again determined and found to be 17.1%. The reaction mixture was then heated to 70° C. and the reaction was continued at this temperature. After a further 60 minutes, the isocyanate content of the mixture was 15.2%. After a further 90 minutes during which the reaction mixture was stirred at 70° C., the isocyanate content was 13.8% NCO and after yet a further 180 minutes stirring at 70° C. it was found to be 11.8%. 5.2 ml of stopper solution I were then added to the reaction mixture. A clear, yellow, 70% solution of a prepolymer containing isocyanurate and oxazolidinone groups was obtained. The solution was stable in storage and had a viscosity of 310 mPa.s (23° C.).

Example 3

1900 parts by weight of the diisocyanate mixture described in Example 1 and 100 parts by weight of the diglycidyl ether described in Example 1 were mixed with 1 ml of dimethylbenzylamine at 50° C. and heated to 120° C. The formation of isocyanurate and oxazolidinone groups which set in instantly was indicated by the slightly exothermic reaction. After a reaction time of 15 minutes, the reaction temperature was 126° C. The reaction was controlled and the temperature kept below 130° C. by the addition of 1 ml of stopper solution I.

This procedure (i.e. addition of 1 mol of stopper solution I) was repeated three times within 3 minutes so that the reaction mixture contained 4 ml of stopper solution I at this stage. The reaction temperature at the same time fell to 125° C. A sample was removed after a reaction time of 20 minutes and the isocyanate content of the mixture was determined and found to be 20.1% NCO. After a further reaction period of 15 minutes at a reaction temperature of 125° to 126° C., the isocyanate content of the mixture was 19.1% NCO and after a further reaction period of 30 minutes at 125° to 127° C. a sample removed from the reaction mixture showed that a tack-free, easily powdered, soluble resin which was solid at room temperatures had been formed. A further 9 ml of stopper solution I was then added to the reaction mixture, and the whole mixture was stirred for 10 minutes at 125° to 126° C. and then poured out on a Teflon coated plate. A resin which was clear and tack-free at room temperature and had an isocyanate content of 16.4% NCO was obtained.

Example 4

20 parts by weight of the diglycidyl ether described in Example 1 and 380 parts by weight of a polyisocyanate mixture of the diphenyl methane series (obtained by the phosgenation of an aniline/formaldehyde condensate and having a viscosity at 20° C. of 467 mPa.s and an isocyanate content of 30.3%) were mixed with 0.4 ml of dimethylbenzylamine at 50° C. and heated to 120° C. The reaction mixture was then stirred at this temperature for 60 minutes and at the end of this time had an isocyanate content of 20.5% NCO. The reaction was stopped by the addition of 5.2 ml of stopper solution I. A mixture of 20 parts by weight of diglycidyl ether from Example 1 and 380 parts by weight of the polyisocyanate mixture described above was added to the reaction mixture with stirring. A reaction resin which was highly viscous at room temperature and had the following properties was obtained:
NCO content: 25% NCO.
Viscosity: $\eta 35°$ C.=81,000 mPa.s.

Example 5

950 parts by weight of the diisocyanate mixture described in Example 1, 50 parts by weight of the diglycidyl ether also described in Example 1 and 50 parts by weight of a bis-(dimethyl-hydroxymethyl-silyl)-ether were mixed with 0.5 ml of dimethylbenzylamine and heated to 70° C. A clear solution was obtained after an initial cloudiness. The reaction temperature rose to 95° C. after a reaction time of 10 minutes. 0.5 ml of stopper solution I were then added to the reaction mixture. A resin which was liquid at room temperature and had the following properties was obtained:
NCO content: 22% NCO.
Viscosity: $\eta 25°$ C.=6920 mPa.s.

Example 6

100 parts by weight of the storage stable resin described in Example 1 were used in 4 parallel experiments in which 1 part by weight of the latent catalyst indicated in the following table was added and the gelling times (cross linking times) at 160° C. were determined. Each of the mixtures containing the latent catalysts was stable at room temperatures for longer than 7 days (no significant rise in viscosity).

| Ex. No. | Latent Catalyst | | Gel Time at 160° C. (Min) |
|---|---|---|---|
| 6a | $Et_3N^{\oplus}H$ (triethylammonium) | $[O-P(=O)(OBu)_2]^{\ominus}$ | >60 |
| 6b | $C_6H_5-CH_2-N^{\oplus}H(CH_3)_2$ | $[O-P(=O)(OBu)_2]^{\ominus}$ | 10 |
| 6c | $H_{17}C_8-N^{\oplus}H(CH_3)_2$ | $[O-P(=O)(OBu)_2]^{\ominus}$ | 4 |
| 6d | $H_{17}C_8-N(CH_3)_2$ | $BCl_3$ | 4 |

Example 7

475 parts by weight of the diisocyanate mixture described in Example 1, 25 parts by weight of the diglycidyl ether also described in Example 1 and 0.25 ml (1.6 m mol) of dimethylbenzylamine were mixed together and heated to 120° C. The slightly exothermic reaction raised the reaction temperature to 125° C. within 30 minutes without external heating. A sample removed with a glass rod showed that a resin which was solid at room temperature had been formed. The reaction was stopped by the addition of 0.70 g (3.25 m mol) of 3-nitrobenzene an sulfonic acid methyl ester (stopper II) to the mixture which was then stirred for a further 15 minutes at 120° to 130° C. and the resin formed was poured out on a Teflon coated plate. A resin which was tack-free and easily pulverized at room temperature and had an isocyanate content of 17.2% NCO was obtained.

Example 8

400 parts by weight of the diisocyanate mixture described in Example 1 and 100 parts by weight of the diglycidyl ether also described in Example 1 were mixed with 0.25 ml (1.6 m mol) of dimethylbenzylamine and heated to 120° C. The exothermic reaction which set in at once raised the reaction temperature to 127° C. without external heating.

The reaction was stopped by the addition of 3.25 ml of stopper solution III (=14.4 wt. % solution of benzene sulfonic acid methyl ester in a mixture of 60% of 2,4'-diisocyanatodiphenyl methane and 40% of 4,4'-diisocyanatodiphenyl methane). A storage stable, readily soluble resin having the following properties was obtained.
Viscosity: $\eta=17,620$ mPa.s (25° C.).
NCO content: 20.1% NCO.

Example 9

100 parts by weight of the resin produced in Example 1 having a viscosity of $\eta 25°$ C.=9300 mPa.s and an isocyanate content of 23.6% NCO were mixed with 0.5 parts by weight of dimethylbenzyl ammonium dibutyl phosphate and degassified in a vacuum at about 5 mbar and 80° C. with stirring until the liquid in the container was free from bubbles. The time required was about 20 minutes. The reaction mixture was then poured into a plate mold (150×139×4 mm) which had been preheated to 80° C. Hardening took place in a heating cupboard at the following temperature program: 2 h 80° C.+1 h 100° C.+1 h 120° C.+1 h 140° C.+1 h 160° C.+16 h 200° C. Gelling of the reaction mixture in the plate mold set in at 140° C. The material was partly hardened after 1 h at 140° C. and was then hardened at the given times and temperatures. The sample plate obtained after cooling was completely free from bubbles and had the following properties according to the indicated DIN number:

| Impact strength | (kJ/m²) | 8.84 | DIN 53453 |
| --- | --- | --- | --- |
| Flexural strength | (MPa) | 85.2 | DIN 53452 |
| Edge fiber elongation | (%) | 2.44 | DIN 53452 |
| Martens dimensional stability under heat | (°C.) | 249 | DIN 53462 |
| Ball indentation hardeners | (MPa) | 233.5 | DIN 53456 |

Example 10

100 parts by weight of the resin prepared in Example 1 (η25° C.=9300 mPa.s, 23.6% NCO) were mixed with 100 parts by weight of quartz powder and degassified under vacuum as described in Example 9. 0.5 parts by weight of dimethylbenzyl ammonium dibutyl phosphate were added to the reaction mixture after 20 minutes and the mixture was again degassified for 10 minutes with stirring. The composition obtained by this method could easily be cast and was hardened as described in Example 9. An optically flawless plate which had the following mechanical properties was obtained after cooling at room temperature:

| Impact strength | (kJ/m²) | 3.90 | |
| --- | --- | --- | --- |
| Flexural strength | (MPa) | 94.2 | |
| Edge fiber elongation | (%) | 1.2 | |
| Martens dimensional stability under heat | (°C.) | >250 | |
| Ball indentation hardeners | (MPa) | 372.8 | |
| Tensile strength | (MPa) | 50.1 | DIN 53455 |
| Elongation | (%) | 0.4 | DIN 53455 |
| E-modulus | (MPa) | 8665 | DIN 53457 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-stage process for the production of molded articles comprising
    (a) reacting
        (1) at least one organic polyisocyanate with
        (2) at least one organic compound containing at least two epoxide groups
    in quantities such that the ratio of isocyanate groups to epoxide groups is from 1.2:1 to 500:1, in the presence of
        (3) a tertiary amine catalyst
    to form an intermediate product containing oxazolidinone and isocyanurate groups,
    (b) stopping reaction (a) after no more than 65% of the isocyanate groups present in polyisocyanate (1) have reacted by adding an alkylating sulfonic acid alkyl ester, methyl iodide and/or dimethyl sulfate in a quantity which is at least equivalent to the quantity of tertiary amine (3) present,
    (c) adding at least one latent catalyst capable of being activated by heat to the mixture of (b),
    (d) supplying the mixture of (c) to a mold, and
    (e) heating to complete the crosslinking of the intermediate product.
2. The process of claim 1 in which an auxiliary agent or additive is included as a starting component in the mixture reacted in (a).
3. The process of claim 1 in which an auxiliary agent or additive is added to the intermediate product obtained in (a).
4. The process of claim 1 in which the latent catalyst is selected from tertiary and quaternary ammonium salts of alkylating or acid esters of organic phosphonic acids and of phosphoric acid, addition complexes of boron trihalides with tertiary amines and mixtures thereof.
5. The process of claim 1 in which auxiliary agents and additives are employed.
6. The process of claim 5 in which the auxiliary agent is an olefinically unsaturated compound and/or an organic compound having a molecular weight of from 62 to 2000 and at least two alcoholic hydroxyl groups.
7. The process of claim 6 in which an olefinically unsaturated compound selected from styrene, maleic imide derivatives and mixtures thereof is employed in a quantity of up to 100 wt. % based upon the total weight of polyisocyanate (1) and epoxide (2).
8. The process of claim 6 in which an organic compound containing at least two alcoholic hydroxyl groups is employed in a quantity such that the ratio of NCO groups in polyisocyanate (1) to the alcoholic hydroxyl groups of the auxiliary agent is at least 2:1.

* * * * *